United States Patent [19]

Beckmann et al.

[11] Patent Number: 5,756,753
[45] Date of Patent: May 26, 1998

[54] METHINE AND AZAMETHINE DYES BASED ON NAPHTHOQUINONES IN NONLINEAR OPTICS

[75] Inventors: Stefan Beckmann, Bad Dürkheim; Karl-Heinz Etzbach, Frankenthal; Rüdiger Sens, Mannheim, all of Germany

[73] Assignee: BASF Aktiengesellschaft, Ludwigshafen, Germany

[21] Appl. No.: 750,846

[22] PCT Filed: Jun. 16, 1995

[86] PCT No.: PCT/EP95/02328

§ 371 Date: Dec. 24, 1996

§ 102(e) Date: Dec. 24, 1996

[87] PCT Pub. No.: WO96/00409

PCT Pub. Date: Jan. 4, 1996

[30] Foreign Application Priority Data

Jun. 27, 1994 [DE] Germany .................. 44 22 333.1

[51] Int. Cl.$^6$ .................. C07D 277/28; C07D 333/06
[52] U.S. Cl. .................. 548/194; 548/198; 548/136; 548/143; 549/68; 549/74; 558/406; 558/409
[58] Field of Search .................. 548/194, 198, 548/136, 143; 549/68, 74; 558/406, 409

[56] References Cited

U.S. PATENT DOCUMENTS 5,364,919  11/1994  Etzbach et al. .................. 526/265

FOREIGN PATENT DOCUMENTS 0 312 856  4/1989  European Pat. Off. .
39 04 797  8/1990  Germany .
44 01 912  7/1995  Germany .

OTHER PUBLICATIONS

Chemical Abstract, 123:85918 1994.
Chemical Physics, vol. 173, pp. 99–108, 1993, Rüdiger Wortmann, et al., "Deviations from Kleinman Symmetry of the Second–Order Polarizability Tensor in Molecules with Low–Lying Perpendicular Electronic Bands".
Journal of Physical Chemistry, vol. 96, pp. 9724–9730, 1992, Rüdiger Wortmann, et al., "Electrooptical Absorption Measurements of Phototautomerizing Systems. $S_0$ and $S_1$ Static Polarizabilities of Bipyridinediols".
Chemistry and Industry, pp. 600–608, 1990, Carole Jones, "Electro–Optics: Polymers for Non–Linear Optical Devices".
Chemical Physics, vol. 173, pp. 305–314, 1993, Frank Würthner, et al., "Second–Order Polarizability of Donor–Acceptor Substituted Oligothiophenes: Substituent Variation and Conjugation Length Dependence".
Journal of Organic Chemistry, vol. 54, pp. 3774–3778, M.S. Paley, et al., "A Solvatochromic Method for Determining Second–Order Polarizabilities of Organic Molecules", 1990.
Lösungsmittelabhängigkeit Der Wellenzahl Von Elektronenbanden, pp. 1441–1471, W. Liptay, "Die Lösungsmittelabhängigkeit Der Wellenzahl Von Elektronenbanden Und Die Chemisch–Physikalischen Grundlagen", 1989.
Ullmann's Encyclopedia of Industrial Chemistry, vol. A1: Abrasives to Aluminum Oxide, pp. 240–293, Wolfgang Gerhartz, et al, 1993.
Ulmann's Encyclopedia of Industrial Chemistry, vol. A10: Ethanolamines to Fibers, 4. Synthetic Organic, pp. 284–285, Wolfgang Gerhartz, et al, 1992.

*Primary Examiner*—Joseph McKane
*Attorney, Agent, or Firm*—Oblon, Spivak, McClelland, Maier & Neustadt, P.C.

[57] ABSTRACT

Naphthalene derivatives of the formula

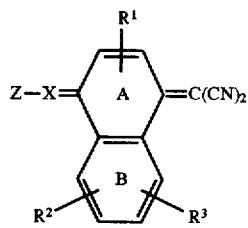

where the rings A and B may be benzofused, X is nitrogen or a radical of the formula CH or CH=CH—CH, Z is a heterocyclic radical or additionally, when x is CH=CH—CH, a 5- or 6-membered aromatic carbocyclic radical, and $R^1$, $R^2$ and $R^3$ are hydrogen, $C_1$–$C_4$-alkyl or $C_5$–$C_7$-cycloalkyl, are useful in nonlinear optics.

6 Claims, No Drawings

METHINE AND AZAMETHINE DYES BASED ON NAPHTHOQUINONES IN NONLINEAR OPTICS

This application is a 371 of PCT/EP95/02328 filed Jun. 16, 1995.

The present invention relates to the use of methine or azamethine dyes based on naphthoquinones in nonlinear optics and to novel methine dyes.

The nonlinear optical properties of organic compounds find application in many areas of optoelectronics. Examples are applications in frequency doubling, phase modulators, optical amplifiers, interferometers, optical switches or communications technology.

It is common knowledge that organic materials, in particular polymers with specific chromophores, can have nonlinear optical properties which in some instances are more considerable than those of comparable inorganic materials.

The materials currently most frequently used are inorganic crystals, for example of potassium dihydrogenphosphate or lithium niobate. These crystals are complicated and costly to produce and, owing to their rigid structure, difficult to use in optical apparatus. A further disadvantage are their small nonlinear effects.

A particular advantage of suitable organic chromophores and their use in polymeric materials is their simple preparation and processing.

The chromophores used in nonlinear optics are generally used either in crystalline form or in polymer-bound form.

DE-A-3 904 797, EP-A-312 856 and EP-A-572 898 disclose the use of dyes in polymeric nonlinear optical systems.

It is an object of the present invention to provide suitable methine or azamethine dyes based on naphthoquinones which shall be advantageously used in polymeric nonlinear optical systems. More particularly, such dyes shall have large hyperpolarizability values, good thermal stability, good compatibility with the polymers used in nonlinear optical systems, and good film-forming properties with copolymers.

We have found that this object is achieved by naphthalene derivatives of the formula I

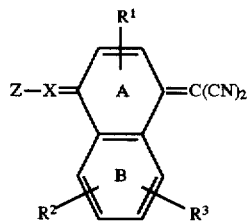

where the rings A and B may each be benzofused,

X is nitrogen or a radical of the formula CH or CH=CH—CH,

Z is a 5- or 6-membered aromatic heterocyclic radical or additionally, when X is CH=CH—CH, a 5- or 6-membered aromatic carbocyclic radical, and $R^1$, $R^2$ and $R^3$ are independently of one other hydrogen, $C_1$–$C_4$-alkyl or $C_5$–$C_7$-cycloalkyl, in nonlinear optics.

Z in the formula I can be derived for example from components of the benzene, thiophene, thiazole, oxadiazole or thiadiazole series.

Particularly suitable radicals Z include for example those of the formulae IIIa to IIIf

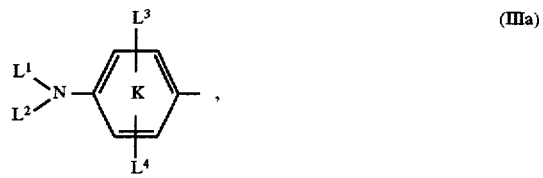

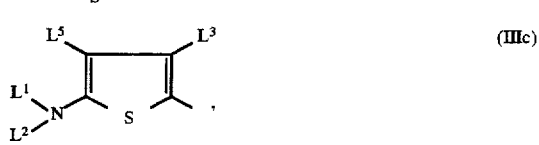

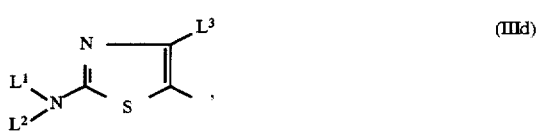

where the ring K may be benzofused, $L^1$ and $L^2$ are independently of each other hydrogen, $C_1$–$C_{10}$-alkyl which may be phenyl-, hydroxyl-, acryloyloxy- or methacryloyloxy-substituted, or phenyl, or $L^1$ and $L^2$ are together with the nitrogen atom joining them together pyrrolidinyl, piperidinyl, morpholinyl, piperazinyl or N-($C_1$–$C_4$-alkyl) piperazinyl, $L^3$ and $L^4$ are independently of each other hydrogen, $C_1$–$C_{10}$-alkyl, $C_5$–$C_7$-cycloalkyl, $C_1$–$C_{10}$-alkoxy, cyano or halogen, and $L^5$ is hydrogen, $C_1$–$C_{10}$-alkyl which may be phenyl-, hydroxyl-, acryloyloxy- or methacryloyloxy-substituted, $C_5$–$C_7$-cycloalkyl, phenyl, $C_1$–$C_{10}$-alkoxy, cyano, nitrogen or halogen.

Any alkyl appearing in the abovementioned formulae may be straight-chain or branched.

In any substituted alkyl appearing in the abovementioned formulae the number of substituents is generally 1 or 2.

$L^1$, $L^2$, $L^3$, $L^4$, $L^5$, $R^1$, $R^2$ and $R^3$ are each for example methyl, ethyl, propyl, isopropyl, butyl, isobutyl, sec-butyl or tert-butyl.

$L^1$, $L^2$, $L^3$, $L^4$ and $L^5$ may each also be for example pentyl, isopentyl, neopentyl, tert-pentyl, hexyl, 2-methylpentyl, heptyl, octyl, 2-ethylhexyl, isooctyl, nonyl, isononyl, decyl or isodecyl (the above designations isooctyl, isononyl and isodecyl are trivial names derived from the oxo process alcohols—cf. Ullmann's Encyclopedia of Industrial Chemistry, 5th Edition, Vol. A1, pages 240 to 293, and Vol. A10, pages 284 to 285).

$L^3$, $L^4$, $L^5$, $R^1$, $R^2$ and $R^3$ may each also be for example cyclopentyl, cyclohexyl or cycloheptyl.

$L^3$, $L^4$ and $L^5$ may each also be for example methoxy, ethoxy, propoxy, isopropoxy, butoxy, isobutoxy, secbutoxy, pentyloxy, isopentyloxy, neopentyloxy, tert-pentyloxy, hexyloxy, 2-methylpentyloxy, heptyloxy, octyloxy, 2-ethylhexyloxy, isooctyloxy, nonyloxy, isononyloxy, decyloxy, isodecyloxy, fluorine, chlorine, bromine or iodine.

$L^1$ and $L^2$ $L^5$ may each also be for example benzyl, 1- or 2-phenylethyl, 2-hydroxyethyl, 2-hydroxypropyl, 3-hydroxypropyl, 2-hydroxybutyl, 4-hydroxybutyl, 5-hydroxypentyl, 6-hydroxyhexyl, 7-hydroxyheptyl, 8-hydroxyoctyl, 9-hydroxynonyl, 10-hydroxydecyl, 2-acryloyloxyethyl, 2-methacryloyloxyethyl, 2- or 3-acryloyloxypropyl, 2- or 3-methacryloyloxypropyl, 2- or 4-acryloyloxybutyl, 2- or 4-methacryloyloxybutyl, 5-acryloyloxypentyl, 5-methacryloyloxypentyl, 6-acryloyloxyhexyl, 6-methacryloyloxyhexyl, 7-acryloyloxyheptyl, 7-methacryloyloxyheptyl, 8-acryloyloxyoctyl, 8-methacryloyloxyoctyl, 9-acryloyloxynonyl, 9-methacryloyloxynonyl, 10-acryloyloxydecyl or 10-methacryloyloxydecyl.

Preference is given to the use of naphthalene derivatives of the formula I where the rings A and B are not benzofused.

Preference is further given to the use of naphthalene derivatives of the formula I where $R^1$, $R^2$ and $R^3$ are each hydrogen.

Preference is further given to the use of naphthalene derivatives of the formula I where Z is derived from a component of the thiophene, thiazole, oxadiazole or thiadiazole series or additionally, when X is CH=CH—CH, from a component of the benzene series.

Particular preference is given to the use of naphthalene derivatives of the formula I where Z is derived from a component of the thiophene or thiazole series, especially from radicals of the formula IIIb, IIIc or IIId or additionally, when X is CH=CH—CH, from a component of the benzene series, especially from the radicals of the formula IIIa.

The naphthalene derivatives of the formula I are partly known and described for example in J. Chem. Soc. Perk. Trans. I, pages 2434 to 2442, 1988.

The present invention further provides naphthalene derivatives of the formula II

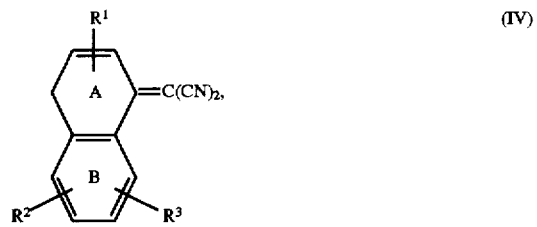

where
the rings A and B may each be benzofused,
w is a radical of the formula CH or CH=CH—CH,
Z is a 5- or 6-membered aromatic heterocyclic radical or additionally, when W is CH=CH—CH, a 5- or 6-membered aromatic carbocyclic radical, and
$R^1$, $R^2$ and $R^3$ are independently of one other hydrogen, $C_1$–$C_4$-alkyl or $C_5$–$C_7$-cycloalkyl.

Preference is given to naphthalene derivatives of the formula II where the rings A and B are not benzofused.

Preference is further given to naphthalene derivatives of the formula II where $R^1$, $R^2$ and $R^3$ are each hydrogen.

Preference is further given to naphthalene derivatives of the formula II where Z is derived from a component of the thiophene, thiazole, oxadiazole or thiadiazole series or additionally, when W is CH=CH—CH, from a component of the benzene series.

Particular preference is given to naphthalene derivatives of the formula II where Z is derived from a component of the thiophene or thiazole series, especially from radicals of the formula IIIb, IIIc or IIId or additionally, when W is CH=CH—CH, from a component of the benzene series, especially from the radicals of the formula IIIa.

The naphthalene derivatives of the formula II can be prepared by methods known per se.

For example, a dicyanomethylnaphthalene of the formula IV

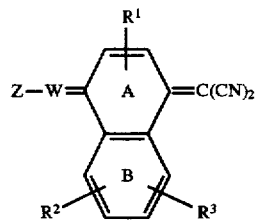

(IV)

where $R^1$, $R^2$ and $R^3$ and the rings A and B are each as defined above, can be condensed with an aldehyde of the formula V $$Z-(CH=CH)_n-CHO \qquad (V),$$

where Z is as defined above and n is 0 or 1.

The aldehydes of the formula V are generally described in the literature. The preparation of heterocyclic aldehydes of this kind is described for example in German Patent Application P 44 01 912.2.

The naphthalene derivatives of the formula I are thermally stable above 200° C. and have particularly large molecular hyperpolarizability values (β). The dyes also possess good compatibility with the polymers used in nonlinear optical systems and also good film-forming properties in copolymers.

The molecular hyperpolarizability can be determined for example by measuring the solvatochromism (see for example Z. Naturforschung, 20a (1965), 1441–1471, or J. Org. Chem., 54 (1989), 3775–3778). This method of measurement involves determining the position of the absorption band of a compound in different solvents, for example in dioxane or dimethyl sulfoxide. The shift of the absorption band is then directly proportional to the β value, i.e. compounds having a large solvatochromic shift have a large molecular hyperpolarizability and are therefore highly suitable for use in nonlinear optical systems (see for 45 example Chemistry and Industry, 1 Oct. 1990, pages 600 to 608).

Attention may be drawn in particular to the suitability of the novel compounds for use in communications technology, electro-optical modulators (e.g. Mach-Zehnder interferometers), optical switches, frequency mixing or waveguides.

The Examples which follow illustrate the invention

EXAMPLE 1

3.50 g (0.02 mol) of 4-(dimethylamino)cinnemaldehyde and 3.84 g (0.02 mol) of 1-dicyanomethylnaphthalene were heated in 40 ml of acetic anhydride at 80° C. for 3 h. After cooling down, the batch was stirred at 20° C. for a further 6 h. The residue was filtered off with suction, washed with isopropanol and dried at 50° C. under reduced pressure, yielding 2.95 g of the compound of the formula

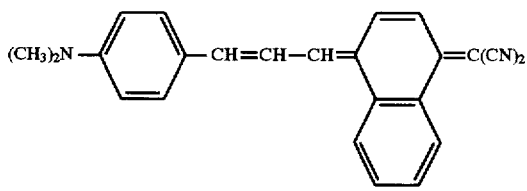

$C_{24}H_{19}N_3$ (349) Calculated: C 82.49 H 5.48 N 12.03
Found: C 82.10 H 5.38 N 12.05

EXAMPLE 2

1.7 g (0.005 mol) of the compound of the formula

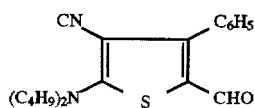

and 0.96 g (0.005 mol) of 1-dicyanomethylnaphthalene were heated in 15 ml of acetic anhydride at 75° C. for 2 h. After cooling down, the batch was stirred at 20° C. for 12 h. The resulting precipitate was filtered off with suction, washed with a little methanol and dried at 50° C. under reduced pressure, yielding 0.5 g of the compound of the formula

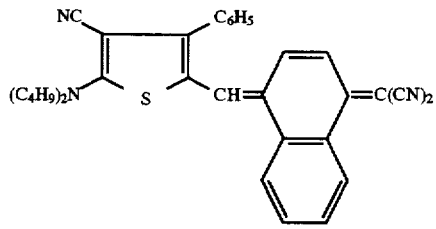

$C_{33}H_{30}N_4S$ (515) Calculated: C 77.01 H 5.88 N 10.89 S 6.23 Found: C 76.84 H 5.68 N 10.81 S 6.10

EXAMPLE 3

3.9 g (0.01 mol) of the compound

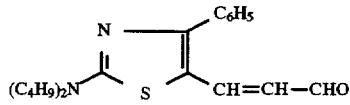

and 1.9 g (0.01 mol) of 1-dicyanomethylnaphthalene were heated in 20 ml of acetic anhydride at 80° C. for 2 h in the presence of 0.35 g of sodium acetate. After cooling down, the batch was stirred at 20° C. for 12 h. The resulting precipitate was filtered off with suction, washed with isopropanol and dried at 50° C. under reduced pressure, yielding 2.59 g of the compound of the formula

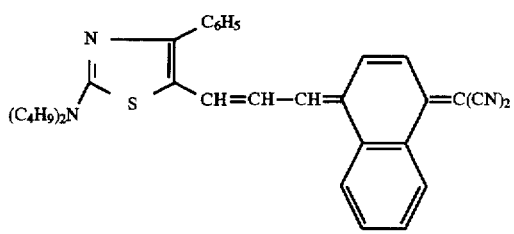

$C_{33}H_{32}N_4S$ (517) Calculated: C 76.71 H 6.24 N 10.84 S 6.21 Found: C 75.70 H 6.11 N 10.82 S 6.26

EXAMPLE 4

3.16 g (0.01 mol) of the compound of the formula

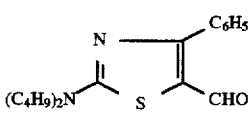

and 1.9 g (0.01 mol) of 1-dicyanomethylnaphthalene were heated at the boil in 30 ml of acetic anhydride for 1 h. The resulting dye was filtered off with suction, washed with isopropanol and dried at 50° C. under reduced pressure, yielding 3.81 g of the compound of the formula

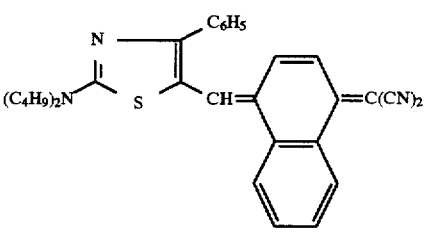

$C_{31}H_{30}N_4S$ (491) Calculated: C 75.88 H 6.16 N 11.42 S 6.53 Found: C 75.69 H 6.02 N 11.66 S 6.48

EXAMPLE 5

1.12 g (0.01 mol) of 2-formylthiophene and 1.9 g (0.01 mol) of 1-dicyanomethylnaphthalene were heated at the boil in 30 ml of acetic anhydride for 1 h. After cooling down, the batch was stirred at 20° C. for 12 h. The resulting product was filtered off with suction, washed with isopropanol and dried at 50° C. under reduced pressure, yielding 2.2 g of the compound of the formula

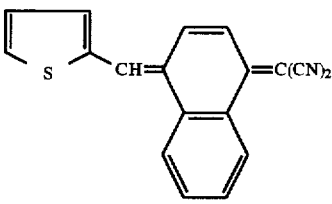

$C_{18}H_{10}N_2S$ (286) Calculated: C 75.50 H 3.52 N 9.78 S 11.20 Found: C 75.48 H 3.68 N 10.50 S 10.20

EXAMPLE 6

1.23 g (0.01 mol) of 2-formyl-5-methylthiophene and 1.9 g (0.01 mol) of 1-dicyanomethylnaphthalene were heated at the boil in 30 ml of acetic anhydride for 1 h. After cooling down, the precipitate was filtered off with suction, washed with isopropanol and dried at 50° C. under reduced pressure, yielding 2.0 g of the compound of the formula

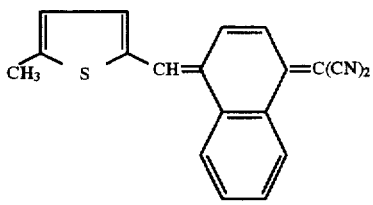

$C_{19}H_{12}N_2S$ (300) Calculated: C 75.97 H 4.03 N 9.33 S 10.67 Found: C 75.80 H 4.10 N 9.15 S 10.42

EXAMPLE 7

2.87 g (0.01 mol) of the compound of the formula

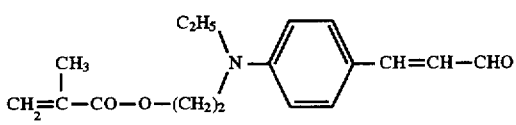

and 1.9 g (0.01 mol) of 1-dicyanomethylnaphthalene were heated at the boil in 40 ml of acetic anhydride for 1 h. After cooling down, the batch was stirred at 20° C. for a further 12 h. the resulting dye was filtered off with suction and washed with isopropanol, and the product was dried at 50° C. under reduced pressure, yielding 2.8 g of the compound of the formula

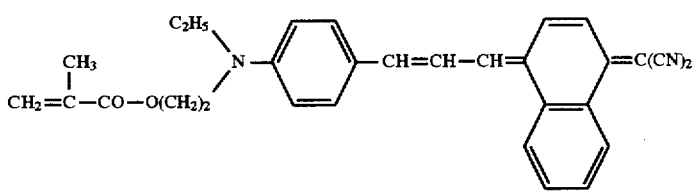

$C_{30}H_{27}N_2O_2$ (447) Calculated: C 83.14 H 6.24 N 6.25
Found: C 82.88 H 6.10 N 6.18

EXAMPLE 8

3.38 g (0.01 mol) of the compound of the formula

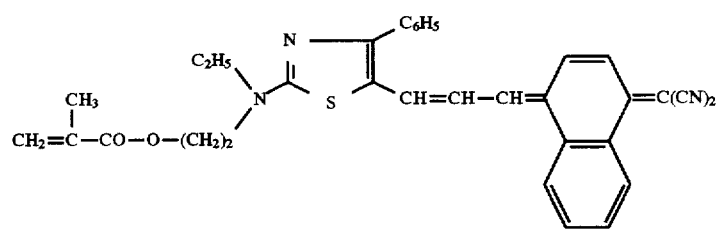

and 1.9 g (0.01 mol) of 1-dicyanomethylnaphthalene were reacted by heating in acetic anhydride for 1 h. Thereafter Example 7 was repeated, affording 3.42 g of the compound of the formula $C_{33}H_{38}N_4O_2$ (512) Calculated: C 77.34 H 5.47 N 10.94
Found: C 76.68 H 5.21 N 10.33

EXAMPLE 9

3.43 g (0.01 mol) of the compound of the formula

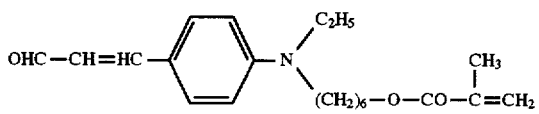

and 1.9 g (0.01 mol) of 1-dicyanomethylnaphthalene were reacted by heating in acetic anhydride for 1 h. Thereafter Example 7 was repeated, affording 3.6 g of the compound of the formula

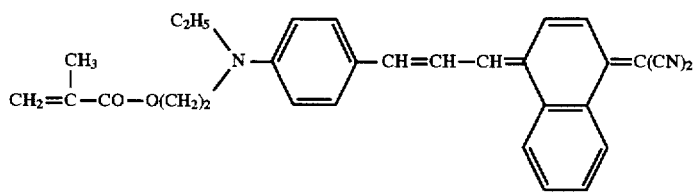

$C_{34}H_{35}N_2O_2$ (503) Calculated: C 81.11 H 6.96 N 5.56 Found: C 81.01 H 6.82 N 5.70

The method described in Z. Naturforschung, 20 a (1965), 1441–1471, was followed to measure the absorption maximum of the individual dyes in both dioxane and dimethyl sulfoxide (DMSO) to determine the solvatochromic shift $\Delta \bar{v}$ [cm$^{-1}$].

The respective measurements are listed below in Table 1.

TABLE 1

| Ex. No. | $\lambda_{max}$ (dioxane) [nm] | $\lambda_{max}$ (DMSO) [nm] | $\Delta \bar{v}$ [cm$^{-1}$] |
|---|---|---|---|
| 1 | 599 | 691 | 2223 |
| 2 | 614 | 663 | 1204 |
| 3 | 625 | 712 | 1755 |
| 7 | 599 | 690 | 2202 |
| 8 | 623 | 710 | |
| 9 | 593 | 690 | |

The suitability of the dyes of the present invention for use in nonlinear optics may in addition be illustrated by determining the hyperpolarizability ($\beta_0$) of the dye described in Example 1. The hyperpolarizability was determined by an electro-optical measurement of absorption. The complete theory of this method of measurement can be found in Chem. Phys. 173 (1993), 305–314, Chem. Phys. 173 (1993), 99–108, and J. Phys. Chem. 96 (1992), 9724–9730. Of significance in addition to the hyper-polarizability ($\beta_0$) is the parameter $\mu_g \beta_0$ ($\mu_g$=dipole moment in ground state), which is relevant for polymeric nonlinear optical systems, since $\mu_g \beta_0$ is directly proportional to the 2nd order susceptibility. The measured $\mu_g \beta_0$ values are listed below in Table 2 in comparison with p-nitroaniline.

TABLE 2

| | $\beta_0$ [10$^{-50}$Cm$^3$V$^{-2}$] | $\mu_g \beta_0$ [10$^{-80}$C$^2$m$^4$V$^{-2}$] |
|---|---|---|
| Ex. No. 1 | 127 | 4830 |
| p-Nitroaniline | | 95 |

The relevant parameter $\mu_g \beta_0$ of the methine dye of the present invention is about 50 times larger than in the literature-described compound and hence impressively underlines the suitability of the novel dyes for use in nonlinear optics.

We claim:

1. A naphthalene compound of the formula (II):

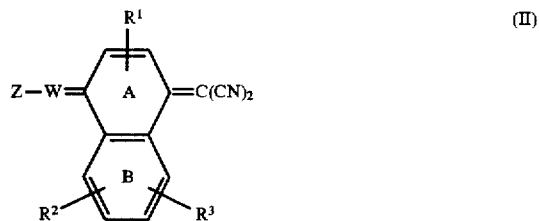

wherein:

rings A and B may each be benzofused;

W is a group of the formula CH or CH=CH—CH;

Z is a 5- or 6-membered aromatic heterocyclic group or, where X is CH=CH—CH, a 5- or 6membered aromatic carbocyclic group;

$R^1$, $R^2$ and $R^3$ are independently of each other hydrogen, $C_1$–$C_4$-alkyl or $C_5$–$C_7$-cycloalkyl.

2. The naphthalene compound of claim 1, wherein rings A and B are not benzofused.

3. The naphthalene compound of claim 1, wherein $R^1$, $R^2$ and $R^3$ are each hydrogen.

4. The naphthalene compound of claim 1, wherein Z is selected from a thiophene, thiazole, oxadiazole or thiadiazole.

5. The naphthalene compound of claim 1, wherein Z is selected from the group consisting of

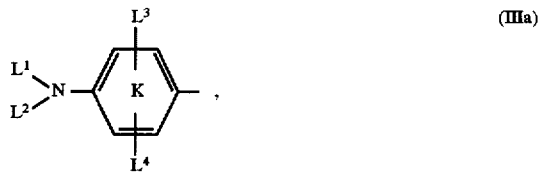

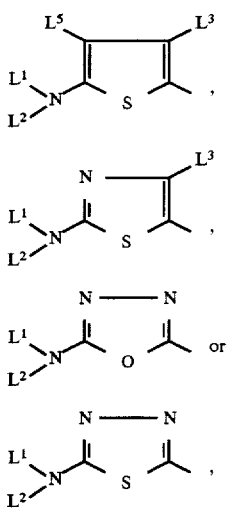

wherein ring K may be benzofused;

$L^1$ and $L^2$ are each independently of each other hydrogen, $C_1$–$C^{10}$alkyl, which is unsubstituted or substituted by phenyl, hydroxyl, acryloyloxy- or methacryloyloxy; phenyl; or $L^1$ and $L^2$ are together with the nitrogen atom joining them together pyrrolidinyl, piperidinyl, morpholinyl, piperazinyl or N—($C_1$–$C_4$-alkyl) piperazinyl;

$L^3$ and $L^4$ are independently of each other hydrogen, $C_1$–$C_{10}$-alkyl, $C_5$–$C_7$-cycloalkyl, $C_1$–$C_{10}$-alkoxy, cyano or halogen; and $L^5$ is hydrogen, $C_1$–$C_{10}$-alkyl, which is unsubstituted or substituted by phenyl, hydroxyl, acryloyloxy or methacryloyloxy; $C_5$–$C_7$-cycloalkyl, phenyl, $C_1$–$C_{10}$-alkoxy, cyano, nitrogen or halogen.

6. The naphthalene compound of claim 1, wherein Z is selected from a benzene.

* * * * *